No. 728,179. PATENTED MAY 12, 1903.
C. E. SEARCH & E. CHESHIRE.
GEARING FOR TURRET LATHES.
APPLICATION FILED FEB. 1, 1902.
NO MODEL.
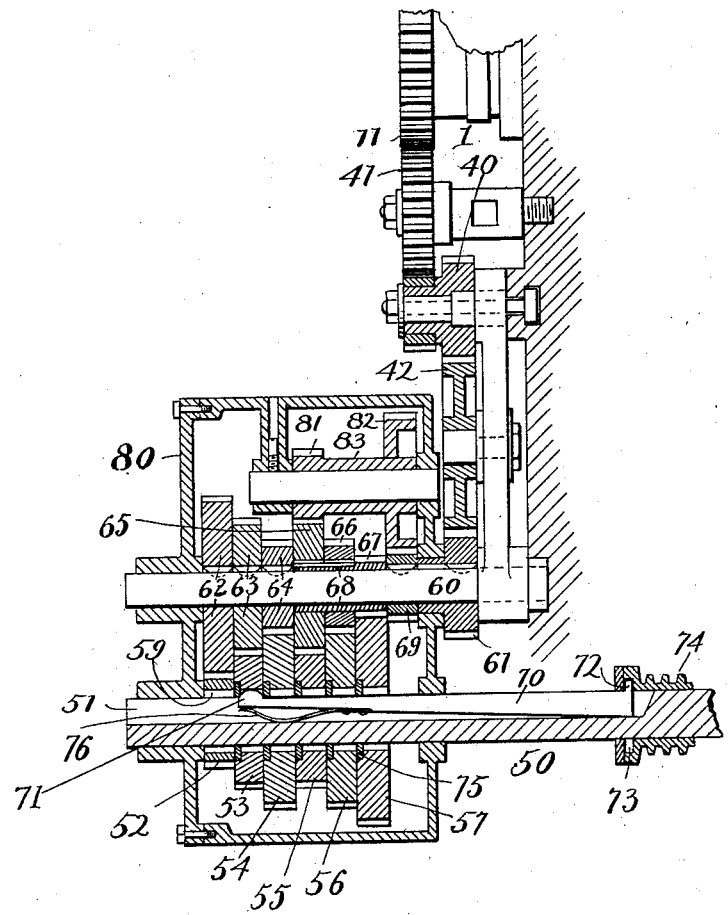
Witnesses
E. B. Gilchrist
B. W. Brockett
Inventors
Charles E. Search
Edward Cheshire
By their attorneys
Thurston & Bates No. 728,179. Patented May 12, 1903.

UNITED STATES PATENT OFFICE.

CHARLES E. SEARCH AND EDWARD CHESHIRE, OF MILWAUKEE, WISCONSIN, ASSIGNORS TO MILWAUKEE MACHINE COMPANY, OF MILWAUKEE, WISCONSIN, A CORPORATION OF WISCONSIN.

GEARING FOR TURRET-LATHES.

SPECIFICATION forming part of Letters Patent No. 728,179, dated May 12, 1903.

Original application filed September 3, 1901, Serial No. 74,080. Divided and this application filed February 1, 1902. Serial No. 92,147. (No model.)

*To all whom it may concern:*

Be it known that we, CHARLES E. SEARCH and EDWARD CHESHIRE, citizens of the United States, residing at Milwaukee, in the county of Milwaukee and State of Wisconsin, have invented a certain new and useful Improvement in Gearing for Turret-Lathes, of which the following is a full, clear, and exact description, reference being had to the accompanying drawing.

The invention relates to speed-gearing adapted for use particularly in turret-lathes and screw-machines and other machines of analogous character.

The object of the invention is to provide novel mechanism by which various operative connections may be quickly made between a driving-shaft and one or more driven shafts, which in turn drive other parts of the machinery, whereby said driven shafts may be independently rotated at any of several rates.

The invention consists in the construction and combination of parts hereinafter described, and pointed out definitely in the claims.

The drawing shows a figure in vertical section of the mechanism embodying the invention.

As shown, the invention forms a part of a turret-lathe, the live-spindle of which is indicated by 1.

50 represents the shaft, which the invention is designed to rotate at suitable speeds compared with the speed of some other rotating member of the machine—in the present case the spindle 1. This shaft 50 may be operatively connected by any suitable mechanism with the carriage and the turret-slide of the lathe—as shown, for example, in our application for a patent on a turret-lathe, Serial No. 74,080, filed September 3, 1901, of which application this application is a division—or this shaft 50 may have any other function and may be suitably connected with any mechanism which it is desired shall be driven by it. The power for rotating this feed-shaft 50 comes from the speed-gear driving-shaft 60, which in the construction shown is driven by the spindle 1 through the gear 11, fast thereto, and a train of gears 40 41 42 and a pinion 61, fast to the shaft 60. On this driving-shaft 60 is a nest of gears, consisting of three gears 62, 63, and 64 of different diameters, which are keyed to the shaft, and three gears 65, 66, and 67 of different diameters, which are fast to a sleeve 68, rotatably mounted upon said shaft. The six gears 52, 53, 54, 55, 56, and 57 shown in the figure are rotatably mounted upon the shaft 50, and each meshes with one of the gears on the speed-gear driving-shaft 60, as shown.

In the shaft 50 is a groove 51, in which a key-bar 70 is movable, said key-bar having an outwardly-projecting key 71, which is adapted to project beyond the shaft and to enter a groove 59 in any one of the gears loosely mounted upon said shaft. This key-bar 70 has at its other end a finger 72, which enters a groove 73 in a sleeve 74, which may slide upon the shaft. A spring 76, lying beneath the free end of this key-bar, forces it up into the position shown, when the key thereon will enter the groove in the gears. Within the casing 80, which incloses these nests of gears, are two gears 81 82 of different diameters, which are connected together by the rotatable sleeve 83. One of these gears meshes with a pinion 69, fast to the change-gear driving-shaft 60, while the other meshes with one of the gears fast to the sleeve 68, which rotates upon said shaft. The sliding sleeve 74, to which the key 70 is attached, may be circumferentially grooved, thereby giving to the sleeve the characteristic of rack with which a pinion or other operating device may engage. By moving the sleeve 74 the key 70 may be caused to engage with any one of the gears rotatably mounted upon the shaft 50, and it might be here stated that between each adjacent pair of these gears is a washer 75, which prevents the simultaneous engagement of the key with two gears.

The operation of the described construction is as follows: The speed-gear driving-shaft 60 is constantly rotated from the spindle through the described train of gears, and consequently the back gears 81 82 will be constantly rotated. If the key is engaging with either of the three gears at the left of the figure, then motion will be transmitted from the driving-shaft 60 direct to the shaft 50 through that one of the gears which is for the time being keyed thereto and that one of the three gears keyed to the driving-shaft which is engaging with it. If the key is engaging with one of the three gears at the right in said figure, then the motion will be transmitted from the driving-shaft 60 through the back gears 81 82 and gears meshing therewith to the sleeve 68, upon which the three gears 65, 66, and 67 are connected, and thence to that one of the gears on the feed-screw shaft with which the key is for the time being engaging.

Having described our invention, we claim—

1. In a lathe, the combination of a change-speed-gearing driving-shaft, mechanism for rotating it, a gear fast to said shaft, and other gears on said shaft, some of which are fast to it and one, at least, of which is loose upon it, two rotatable connected gears of which one is in mesh with the gear loose upon the shaft and the other with the gear first referred to which is fast to said shaft, a driven shaft having a longitudinal groove, gears loosely mounted thereon in mesh with the fast and loose gears on the driving-shaft substantially as described, each of the gears upon the driven shaft having an internal keyway, a key movable in the groove in said shaft whereby to connect said shaft with any gear thereon, a sleeve slidable upon said shaft and connected with said key, and means for moving said sleeve lengthwise of the shaft.

2. In a lathe, the combination of a change-speed-gearing driving-shaft, mechanism for rotating it, a gear fast to said shaft, and other gears on said shaft some of which are fast to it and some of which are connected together but loose upon it, two rotatable connected gears of which one is in mesh with one of the gears loose upon the shaft and the other with the gear first referred to which is fast to said shaft, a driven shaft having a longitudinal groove, gears loosely mounted thereon in mesh with the fast and loose gears on the driving-shaft substantially as described, each of the gears upon the driven shaft having an internal keyway, a key movable in the groove in said shaft whereby to connect said shaft with any gear thereon, a sleeve slidable upon the shaft and having external circumferential grooves and being connected with said key, a rock-shaft, and a pinion secured thereto and engaging with said grooved sleeve.

3. In a lathe, the combination of a change-speed-gearing driving-shaft, mechanism for rotating it, a gear fast to said shaft and other gears on said shaft some of which are fast to it and some of which are connected together but loose upon it, two rotatable connected gears of which one is in mesh with one of the gears loose upon the shaft and the other with the gear first referred to which is fast to said shaft, a driven shaft having a longitudinal groove, gears loosely mounted thereon in mesh with the fast and loose gears on the driving-shaft substantially as described, each of the gears upon the driven shaft having an internal keyway, a key movable in the groove in said shaft whereby to connect said shaft with any gear thereon, washers upon said shaft between said gears whereby to prevent said key from engaging with two gears at the same time.

In testimony whereof we hereunto affix our signatures in the presence of two witnesses.

CHARLES E. SEARCH.
EDWARD CHESHIRE.

Witnesses:
FRANK H. JOHNSTON,
MATHIAS J. SCHMITZ.